United States Patent [19]

Swinburne et al.

[11] Patent Number: 4,941,066
[45] Date of Patent: Jul. 10, 1990

[54] INJECTION MOLDED CENTER CORE FOR A RECORDING DISC AND RELATED METHOD OF MANUFACTURE

[75] Inventors: Stephen G. Swinburne, Scarborough; Anthony L. Gelardi, Cape Porpoise, both of Me.; William Stiles, Renton, Wash.

[73] Assignee: Shape Inc., Biddeford, Mass.

[21] Appl. No.: 192,772

[22] Filed: May 11, 1988

[51] Int. Cl.⁵ .............................................. G11B 23/03
[52] U.S. Cl. ..................................... 360/133; 360/135; 369/282
[58] Field of Search ................. 360/133, 135; 369/282, 369/289, 290; 206/444

[56] References Cited

U.S. PATENT DOCUMENTS

| | | | |
|---|---|---|---|
| 4,030,138 | 6/1977 | Hillier | 360/135 |
| 4,052,750 | 10/1977 | Barber et al. | 360/135 |
| 4,078,246 | 3/1978 | Berthoux et al. | 360/133 |
| 4,152,740 | 5/1979 | Stratton | 360/99 |
| 4,166,622 | 9/1979 | Rager | 274/1 R |
| 4,175,274 | 11/1979 | Mann | 360/99 |
| 4,194,228 | 3/1980 | Duff | 360/133 |
| 4,224,648 | 9/1980 | Roling | 360/97 |
| 4,320,425 | 3/1982 | Hall | 360/97 |
| 4,409,630 | 10/1983 | Saito | 360/99 |
| 4,445,155 | 4/1984 | Takahashi et al. | 360/99 |
| 4,453,246 | 6/1984 | Covington | 369/284 |
| 4,490,764 | 12/1984 | Butz | 360/133 |
| 4,542,426 | 9/1985 | Wilkinson, Jr. et al. | 360/97 |
| 4,544,977 | 10/1985 | Ozawa et al. | 360/133 |
| 4,562,505 | 12/1985 | Mroz | 360/135 |
| 4,581,670 | 4/1986 | Nemoto et al. | 360/133 |
| 4,583,144 | 4/1986 | Kato | 360/133 |
| 4,607,304 | 8/1986 | DeMoss et al. | 360/99 |
| 4,609,964 | 9/1986 | Sobel | 360/135 |
| 4,613,921 | 9/1986 | Holmes | 360/133 |
| 4,616,278 | 10/1986 | Yamaguchi | 369/282 X |
| 4,630,156 | 12/1986 | Saito | 369/282 X |
| 4,631,620 | 12/1986 | Oishi et al. | 360/133 |
| 4,660,119 | 4/1987 | Kato et al. | 360/133 |
| 4,661,875 | 4/1987 | Kinjo | 360/133 |
| 4,686,666 | 8/1987 | Dieffenbach | 360/290 |
| 4,688,127 | 8/1987 | Oishi et al. | 360/132 |
| 4,698,715 | 10/1987 | Oishi | 360/133 |

FOREIGN PATENT DOCUMENTS 0133541 2/1985 European Pat. Off. .
60-20373 5/1985 Japan .

Primary Examiner—A. J. Heinz
Attorney, Agent, or Firm—Staas & Halsey

[57] ABSTRACT

A molded center core for a flexible recording disc and a related method of manufacture are provided. The disc includes a recording media sandwiched between an injection molded center core having a metal insert, and an injection molded ring. The core and ring are ultrasonically welded to hold the media in place. The method includes the steps of: injection molding a separate plastic center core with a metal insert therein; injection molding a separate plastic ring; locating the center core/insert combination in the central opening of the recording media to abut a first surface of the media; locating the molded ring on the center core to abut a second, opposite surface of the media; and permanently connecting the core and ring.

7 Claims, 2 Drawing Sheets

INJECTION MOLDED CENTER CORE FOR A RECORDING DISC AND RELATED METHOD OF MANUFACTURE

BACKGROUND OF THE INVENTION

This invention relates to a recording disc, and more particularly, to an improved center core structure for a flexible recording disc and a related method of manufacture.

Flexible recording discs have gained widespread use due to the ever increasing popularity of word processors and personal computers. An example of a currently used, popular, flexible, recording disc in a cassette is described in Sony Corporation's U.S. Pat. No. 4,445,155, which is shown in FIG. 1 herein.

More particularly, the cassette is indicated generally by reference numeral 10. A flexible recording disc 12 is housed therein. The disc 12 is made of a thin, polymeric film base, such as MYLAR ®, with a magnetic layer formed on at least one side thereof. The disc 12 includes a substantially planar, circular, stamped, stainless steel center core 13 including a hub 14 surrounded by a flange 20. A portion of the core 13 extends through a circular aperture 18 formed centrally in the flexible recording disc 12 and the flange 20 is connected to the disc 12 by means of a double-sided adhesive member 16, known as an "A-ring". In addition, a generally square-shaped, motor shaft insertion aperture 22 and a rectangular, positioning pin insertion aperture 24 are formed substantially centrally of the center core 13. Further, the cassette 10 includes a cover 26, a base 28, fabric liners 30 and 32, and a flexible wiper spring 34.

Conventionally, assembly of the flexible recording disc 12 shown in FIG. 1 includes the following steps. The adhesive A-ring 16 is applied to the underside of the flange 20 of the pre-stamped, metal center core 13. Then, the center core 13 is positioned in the aperture 18 of the flexible recording disc 12 from above so that the flange 20 adheres to the disc 12 around the aperture 18 via the A-ring 16.

The above-described flexible recording disc and method of manufacture, as well as an improved method of manufacture, all using an adhesive "A-ring," are more fully described in Assignee's co-owned U.S. Pat. No. 4,613,392.

The conventional disc and the related method of manufacture are known to suffer several significant drawbacks from an automation and cost efficiency point of view. Namely, the dimensional requirements of the metal center core, especially flatness of the flange, are extremely critical and create a major production quality control problem. Further, creating a consistently high quality center core by stamping metal is difficult. Finally, handling the A-ring is very problematic due to its relatively small, circular size and its double-sided adhesiveness. These problems, of course, slow production, increase rejects, and increase overall costs.

As a result, the prior art discussed above still does not teach a flexible recording disc and related method of manufacture which are capable of the most cost and time efficient automated assembly.

SUMMARY OF THE INVENTION

Accordingly, it is an object of the present invention to provide a flexible recording disc which lends itself to better automation and improved handling, while maintaining the desired performance characteristics of the disc.

It is another object of the present invention to provide a flexible recording disc which eliminates the problems associated with effecting flatness and other dimensional requirements in stamped metal center cores by using a plastic, injection molded center core whose dimensions are more easily controlled.

It is another object of the present invention to provide a flexible recording disc which eliminates the need for adhesive A-rings by utilizing a plastic molded ring that can be ultrasonically welded to a molded center core.

It is another object of the present invention to provide a method of manufacture yielding a more consistent and higher quality flexible recording disc, including the steps of permanently connecting a molded ring and a molded center core, with the recording media sandwiched therebetween.

To achieve the foregoing and other objects of the present invention and in accordance with the purposes of the invention, there is provided the following flexible recording disc and related method of manufacture.

The disc includes: a flexible recording media with a central opening formed therein; a plastic center core injection molded onto a flat, metal insert and received by the central opening; and a plastic injection molded ring connected to the center core with the recording media therebetween.

The method includes the steps of: forming a flexible recording media with a central opening; injection molding a separate center core on a flat, metal insert; injection molding a separate ring; locating the center core/insert combination in the central opening of the recording media; locating the molded ring on the center core with the recording media therebetween; and permanently connecting the core and ring, preferably by ultrasonic welding.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
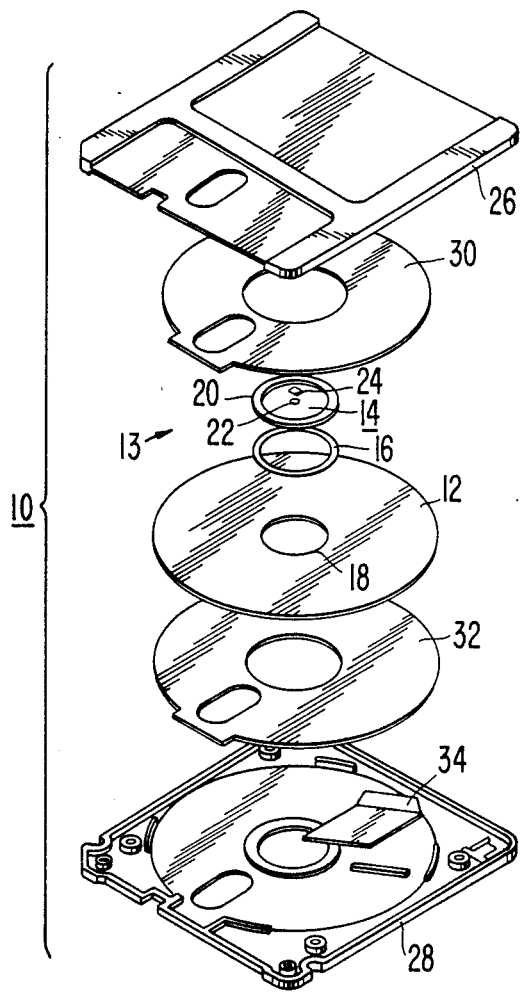
FIG. 1 is an exploded perspective view of a conventional cassette including a flexible recording disc, illustrating particularly the position of the adhesive A-ring between a metal center core and the recording media.

The preferred embodiments according to the present invention will now be described with reference to FIGS. 2-4.

The flexible recording disc according to the present invention is designated by reference numeral 40. The disc 40 generally includes a flexible recording media 42, a molded center core 60, a metal insert 80 and a molded ring 86, each of which is substantially planar and described separately below.

The recording media 42 is a conventional polymeric flexible circular member having two opposed, planar surfaces, upper 44 and lower 46, both of which are usually magnetized. The media 42 also includes an aperture 48 formed centrally therein.

The center core 60 is preferably an injection molded plastic member having a hub 62 and an integrally formed flange 64. The center core 60 can be made of a suitable plastic which is durable and yet economical; an example is acrylonitrile butadiene styrene (ABS). On the upper surface 63 of the center core 60, between the hub 62 and the flange 64, there is formed an annular projection 65. The molded center core 60 includes a generally square-shaped motor shaft insertion aperture 66 formed centrally thereof and a rectangular, positioning pin insertion aperture 68 formed slightly off center thereof, to correspond to identical members in the insert 80, as described below.

The metal insert 80 is preferably stamped as a flat, circular member of metal such as stainless steel. Since a flexible recording disc is driven by a magnetized member via the insert (see U.S. Pat. No. 4,409,630), the insert 80 is preferably metal or a magnetized plastic. This insert 80 includes a conventional square-shaped motor shaft insertion aperture 82 formed centrally therein and a rectangular positioning pin insertion aperture 84 formed slightly off-center thereof.

Figure 3:
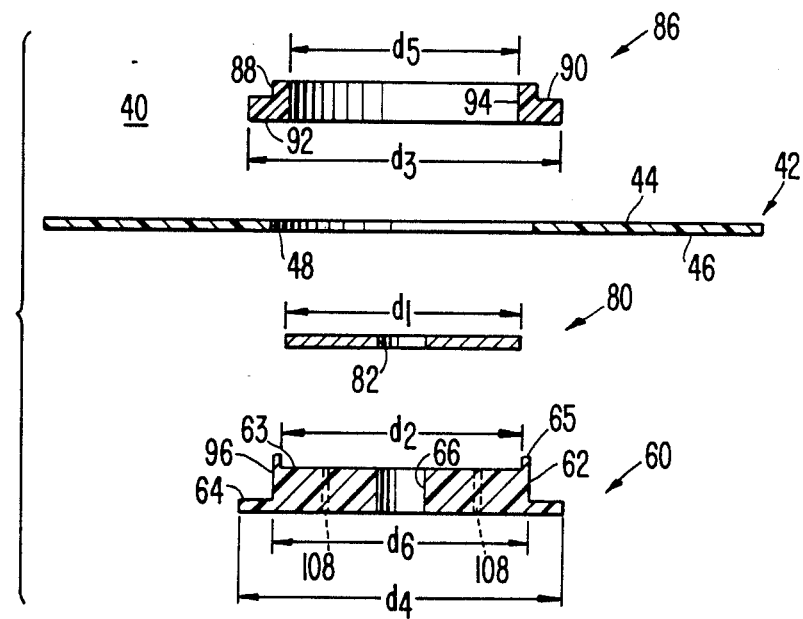
FIG. 3 is a side, cross-sectional view of the exploded flexible disc shown in FIG. 2.
Figure 4:
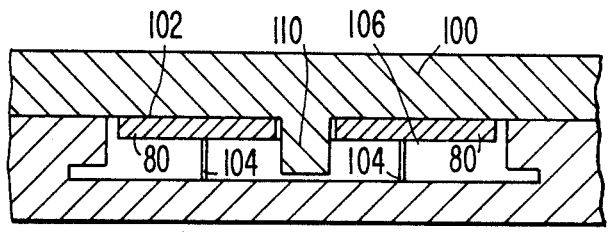
FIG. 4 is a side, cross-sectional view of a mold used to form the center core on the metal insert according to the present invention.

As seen in FIG. 4, to form the center core 60/insert 80 combination, the insert 80 is held against the upper wall 102 of a metal mold 100 by, e.g. three pins 104 (two shown). Then plastic is injection molded into the cavity 106 around the insert 80 to form the center core 60. The pins 104 prevent the insert 80 from moving during molding. As seen in FIG. 3, the pins 104 create small holes 108 in the molded center core 60. The mold 100 is formed to create the motor shaft insertion aperture 66 via a first projection 110 and the positioning pin insertion aperture via a second projection (not shown).

Alternatively, the insert 80 could be applied to the center core 60 by an ABS compatible adhesive after the center core 60 is molded in a modified mold, or by ultrasonic welding.

The ring 86 is preferably injection molded of the same plastic as the center core 60 to facilitate ultrasonic welding therebetween. The ring 86 is a substantially planar member with an annular projection 88 on an upper surface 90 thereof.

As shown, particularly in FIG. 3, the diameter "$d_1$" of the insert 80 is slightly less than the internal diameter "$d_2$" of the annular projection 65. The insert 80 fits closely within the upper surface 63 of the center core 60 due to the molding described above. The ring 86 has an diameter "$d_3$" that is approximately equal to the outer diameter "$d_4$" of the center core 60 and an inner diameter "$d_5$" slightly greater than the external diameter "$d_6$" of the annular projection 65. In this way, the core 60 fits closely within the aperture 18, the outer edges of the ring 86 and the core 60 terminate at a like distance from the center of the media 42 to equally support the media 42 on both sides, and the ring 86 closely fits over the projection 65 and onto the flange 64 of the core 60.

Figure 2:
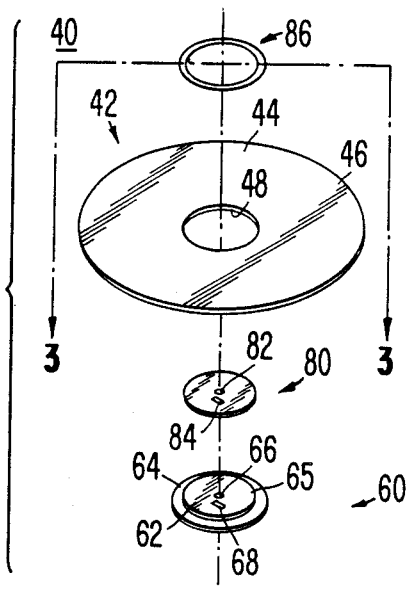
FIG. 2 is an exploded, perspective view of the flexible recording disc according to the present invention, illustrating particularly the recording media between the molded center core/insert combination and ring.

FIGS. 2–4 also illustrate the steps of the method of manufacture according to the present invention.

First, the insert 80 is stamped from flat, metal, such as stainless steel as discussed above. As can be easily understood, it is easier to stamp a flat insert 80, rather than to form the conventional hub 13. The metal insert 80 then is inserted into the mold 100 as described above and the center core 60 is molded onto the insert 80. The ring 86 is separately molded in a different mold (not shown).

The core 60/insert 80 combination is then located in the opening 48 of the media 42 such that the flange 64 abuts the lower annular surface 46 of the media 42 such that at least the annular projection 65 extends through the central aperture 48. The lower surface 92 of the ring 86 is then located against the upper surface 44 of the media 42, with the annular projection 65 entering the ring 86. Finally, the ring 86 and flange 64 of the center core are permanently attached along the corresponding vertical mating surfaces 94 and 96, respectively, preferably by ultrasonic welding. Of course, energy directors (not shown) can be used to facilitate welding of the center core 60 and ring 86. Once attached, the media 42 is permanently and reliably held between the ring 86 and the center core 60. During welding, the core 60 and ring 86 are also each partially welded to the media 42, which prevents rotation of the media 42 relative to the welded core 60 and ring 86.

Although it is described above that welding is used to connect the center core and ring to the media, direct application of adhesive can also be used. More particularly, an ABS compatible adhesive can be applied to the ring 86 and the center core 60 before these members are positioned on the media 42. Adhesives are also currently known which are compatible with MYLAR ® media such as the adhesive used with the conventional A-ring discussed above.

Finally, although it is preferred that a separate center core insert and ring be used, separate members are not essential to carrying out the present invention. For example, the core 60/insert 80 combination can be directly connected to the media by welding or an adhesive, without the need for a ring. Further, if the center core is made from a magnetized plastic, no separate metal insert is at all needed, whether a ring is used or not. Magnetized plastics are a recently developed class of plastics which are formulated with magnetic particles to give the plastic magnetic properties.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

We claim:

1. A recording disc, comprising:
   (a) a flexible recording media having first, lower and second, upper opposing planar surfaces and a central opening formed therein;
   (b) a plastic center core having a first, upper planar surface and a second, lower opposing planar surface, the first and second surfaces being separated by a hub having a first diameter, being positioned in the central opening and abutting the first, lower surface of the media;
   (c) a planar metal insert having a second, smaller diameter and being located on the first, upper planar surface of the center core; and
   (d) a plastic ring abutting the second, upper surface of the media and being connected to the hub of the center core.

2. The disc as recited in claim 1, wherein the center core and ring are injection molded of acrylonitrile butadiene styrene.

3. A recording disc cassette, comprising:
   (a) first and second cassette halves; (b) a flexible recording media having first, lower and second, upper opposing planar surfaces and a central opening formed therein;
   (c) a plastic center core having a motor shaft insertion aperture, a positioning pin insertion aperture, first, upper planar surface and a second, lower opposing, planar surface, the first and second surfaces being separated by a hub having a first diameter and being positioned in the central opening to abut the first, lower surface of the media;
   (d) a planar metal insert having a motor shaft insertion aperture, a positioning pin insertion aperture, and a second, smaller diameter, and being positioned on the first, upper planar surface of the center core with the respective apertures aligned; and
   (e) a plastic ring abutting the second, upper surface of the media and being ultrasonically welded to the hub of the center core.

4. A method for manufacturing a recording disc, comprising the steps of:
   (a) forming a flexible recording media having first, lower and second, upper opposing planar surfaces and a central opening;
   (b) forming a planar metal insert;
   (c) locating the metal insert in a first mold;
   (d) injection molding a center core in the first mold to receive the insert, said center core being formed to include a first, planar, upper surface and a second, opposing, planar, lower surface, the first and second surfaces being separated by a hub having a first diameter larger than a diameter of the metal insert;
   (e) locating the center/core insert in the central opening to abut the first, lower surface of the media;
   (f) injection molding a ring in a second mold;
   (g) locating the molded ring on the center core to abut the second surface of the media; and
   (h) permanently connecting the ring and the hub of the center core.

5. The method as recited in claim 4, wherein step (h) comprises the substep of ultrasonically welding the hub of the core and ring.

6. A method for manufacturing a recording disc cassette, comprising the steps of:
   (a) forming first and second cassette halves;
   (b) forming a flexible recording media having first, lower and second, upper opposing planar surfaces and a central opening;
   (c) injection molding a center core with a planar metal insert therein, each of which includes corresponding motor shaft insertion apertures and positioning pin insertion apertures, said center core further including a first, planar surface and a second, opposing planar surface, the first and second surfaces being separated by a hub, having a first diameter larger than a diameter of the metal insert;
   (d) injection molding ring;
   (e) locating the center core/insert in the central opening and abutting the first, lower surface of the media;
   (f) locating the molded ring on the center core to abut the second, upper surface of the media; and
   (g) permanently connecting the ring and center core.

7. The method as recited in claim 6, wherein step (g) comprises the substep of ultrasonically welding the core and ring.

* * * * *